(12) United States Patent
Scheim et al.

(10) Patent No.: US 9,386,462 B2
(45) Date of Patent: Jul. 5, 2016

(54) METHODS AND APPARATUS FOR DETERMINING AND PLANNING WIRELESS NETWORK DEPLOYMENT SUFFICIENCY WHEN UTILIZING VEHICLE-BASED RELAY NODES

(71) Applicant: GM GLOBAL TECHNOLOGY OPERATIONS LLC, Detroit, MI (US)

(72) Inventors: Kobi Jacob Scheim, Pardess Hanna (IL); Nadav Lavi, Ramat-Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/228,759

(22) Filed: Mar. 28, 2014

(65) Prior Publication Data
US 2015/0281975 A1    Oct. 1, 2015

(51) Int. Cl.
*H04W 16/18*   (2009.01)
*H04W 48/16*   (2009.01)
*H04W 24/02*   (2009.01)

(52) U.S. Cl.
CPC .............. *H04W 16/18* (2013.01); *H04W 48/16* (2013.01); *H04W 24/02* (2013.01)

(58) Field of Classification Search
CPC ... H04W 84/047; H04W 40/04; H04W 40/22; H04W 84/00; H04W 84/18; H04W 88/04; H04W 16/02; H04W 16/04; H04W 16/18; H04W 28/08; H04W 24/00; H04W 24/02
USPC ...................... 455/422.1–425, 446, 11.1, 453
See application file for complete search history.

(56) References Cited

U.S. PATENT DOCUMENTS

| | | | |
|---|---|---|---|
| 8,804,597 | B2 | 8/2014 | Won et al. |
| 8,995,956 | B2 | 3/2015 | Lavi et al. |
| 2006/0199530 | A1 | 9/2006 | Kawasaki et al. |
| 2007/0081479 | A1 | 4/2007 | Kang et al. |

(Continued)

FOREIGN PATENT DOCUMENTS

| CN | 101958747 A | 1/2011 |
|---|---|---|
| CN | 102098708 A | 6/2011 |

(Continued)

OTHER PUBLICATIONS

Scheim, Kobi J., US Patent Application entitled, "Systems and Methods of Facilitating Portable Device Communications," filed on Mar. 28, 2014.

(Continued)

*Primary Examiner* — Kashif Siddiqui
*Assistant Examiner* — Minjung Kim
(74) *Attorney, Agent, or Firm* — Ingrassia Fisher & Lorenz, P.C.

(57) ABSTRACT

A method of planning communication network infrastructure includes calculating a potential capacity of a plurality of vehicular relay nodes in an area, wherein the plurality of vehicular relay nodes relay data between a plurality of portable devices and at least one base station. The method also includes calculating a potential data demand in the area for transferring data between the plurality of portable devices and the at least one base station. The method further includes determining whether the number of base stations serving the area is sufficient by utilizing the potential capacity of the plurality of vehicular relay nodes in the area and the potential data demand in the area.

15 Claims, 5 Drawing Sheets

(56) References Cited

U.S. PATENT DOCUMENTS

| | | | |
|---|---|---|---|
| 2008/0089288 A1 | 4/2008 | Anschutz et al. | |
| 2008/0148374 A1 | 6/2008 | Spaur et al. | |
| 2009/0073946 A1 | 3/2009 | Morita | |
| 2009/0296626 A1 | 12/2009 | Hottinen et al. | |
| 2009/0299857 A1 | 12/2009 | Brubaker | |
| 2010/0020752 A1 | 1/2010 | Anschutz et al. | |
| 2010/0027419 A1 | 2/2010 | Padhye et al. | |
| 2010/0250106 A1 | 9/2010 | Bai et al. | |
| 2011/0092237 A1 | 4/2011 | Kato et al. | |
| 2011/0181106 A1 | 7/2011 | Kim | |
| 2011/0235568 A1 | 9/2011 | Esteves et al. | |
| 2011/0255481 A1 | 10/2011 | Sumcad et al. | |
| 2011/0260884 A1 | 10/2011 | Yi et al. | |
| 2011/0267205 A1 | 11/2011 | McClellan et al. | |
| 2011/0269404 A1 | 11/2011 | Hu et al. | |
| 2011/0294500 A1 | 12/2011 | Chang et al. | |
| 2012/0158820 A1 | 6/2012 | Bai et al. | |
| 2012/0165063 A1* | 6/2012 | Scalia et al. | 455/522 |
| 2012/0196528 A1 | 8/2012 | Kazmi et al. | |
| 2012/0196618 A1 | 8/2012 | Lowell et al. | |
| 2012/0218886 A1 | 8/2012 | Van Phan et al. | |
| 2012/0282932 A1 | 11/2012 | Yu et al. | |
| 2012/0294275 A1 | 11/2012 | Krishnaswamy et al. | |
| 2012/0314576 A1* | 12/2012 | Hasegawa et al. | 370/235 |
| 2013/0069834 A1 | 3/2013 | Duerksen | |
| 2013/0072112 A1 | 3/2013 | Gunnarsson et al. | |
| 2013/0195005 A1 | 8/2013 | Al-Shalash | |
| 2013/0331093 A1 | 12/2013 | Cho et al. | |
| 2014/0004865 A1 | 1/2014 | Bhargava et al. | |
| 2014/0049912 A1 | 2/2014 | Marshall et al. | |
| 2014/0192781 A1 | 7/2014 | Teyeb et al. | |
| 2014/0293852 A1 | 10/2014 | Watanabe et al. | |
| 2014/0362688 A1* | 12/2014 | Zhang et al. | 370/230 |

FOREIGN PATENT DOCUMENTS

| | | |
|---|---|---|
| WO | 2012096605 A1 | 7/2012 |
| WO | 2013116981 A1 | 8/2013 |
| WO | WO 2015010749 A1 * | 1/2015 |

OTHER PUBLICATIONS

USPTO, Office Action for U.S. Appl. No. 14/228,750, mailed Nov. 6, 2015.

United States Patent and Trademark Office, Notice of Allowance for U.S. Appl. No. 14/228,750 mailed Mar. 14, 2016.

* cited by examiner

METHODS AND APPARATUS FOR DETERMINING AND PLANNING WIRELESS NETWORK DEPLOYMENT SUFFICIENCY WHEN UTILIZING VEHICLE-BASED RELAY NODES

TECHNICAL FIELD

The technical field generally relates to radio communication network planning, and more particularly relates to methods and apparatus for determining wireless network sufficiency when utilizing vehicle-based relay nodes.

BACKGROUND

Communication with portable cellular telephones ("portable devices") is often achieved with direct communication with the portable device and a base station, e.g., a "cellular tower". However, such direct communication is often problematic due to any number of technical and environmental factors. For instance, in urban areas, buildings often block radio frequency ("RF") signals that are emitted between the portable device and a base station, which may prevent a communications link from being established or may lead to a low quality link.

One potential improvement to the typical telecommunication system is to utilize relay nodes which can act as a relay or "repeater" between the portable devices and the base stations. These relay nodes may be a part of a vehicle, e.g., an automobile. Such vehicular relay nodes may change the dynamics of the telecommunications system by increasing capacity for each base station and/or limiting the amount of additional base stations that may be needed to anticipate future growth of the system.

Therefore, it is desirable to provide systems and methods for telecommunications network planning with vehicle-based relay nodes. Furthermore, other desirable features and characteristics of the present invention will become apparent from the subsequent detailed description and the appended claims, taken in conjunction with the accompanying drawings and the foregoing technical field and background.

SUMMARY

In one embodiment, a method of planning communication network infrastructure is provided. The method includes calculating a potential capacity of a plurality of vehicular relay nodes in an area, wherein the plurality of vehicular relay nodes relay data between a plurality of portable devices and at least one base station. The method also includes calculating a potential data demand in the area for transferring data between the plurality of portable devices and the at least one base station. The method further includes determining whether the number of base stations serving the area is sufficient by utilizing the potential capacity of the plurality of vehicular relay nodes in the area and the potential data demand in the area.

In another embodiment, an apparatus is provided for assisting in planning communication network infrastructure. The apparatus includes a computer having a processor. The processor is configured to calculate a potential capacity of a plurality of vehicular relay nodes in an area, wherein the plurality of vehicular relay nodes relay data between a plurality of portable devices and at least one base station. The processor is also configured to calculate a potential data demand in the area for transferring data between the plurality of portable devices and the at least one base station. The processor is further configured to determine whether the number of base stations serving the area is sufficient by utilizing the potential capacity of the plurality of vehicular relay nodes in the area and the potential data demand in the area.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Referring to the Figures, wherein like numerals indicate like parts throughout the several views, an exemplary system 100 of facilitating communications are shown and described herein. Furthermore, methods 300, 400 to determine infrastructure requirements to implement the system 100 in a geographic area 101 are shown and described herein. A computer 500 to implement one or more of the methods 300, 400 are also shown and described herein. It should be noted that the computer 500 and methods 300, 400 described herein may be implemented during (a) initial deployment planning of the system 100 (i.e., from "scratch") or (b) subsequent deployment planning for upgrade and maintenance that typically happens on a regular basis.

Figure 1:
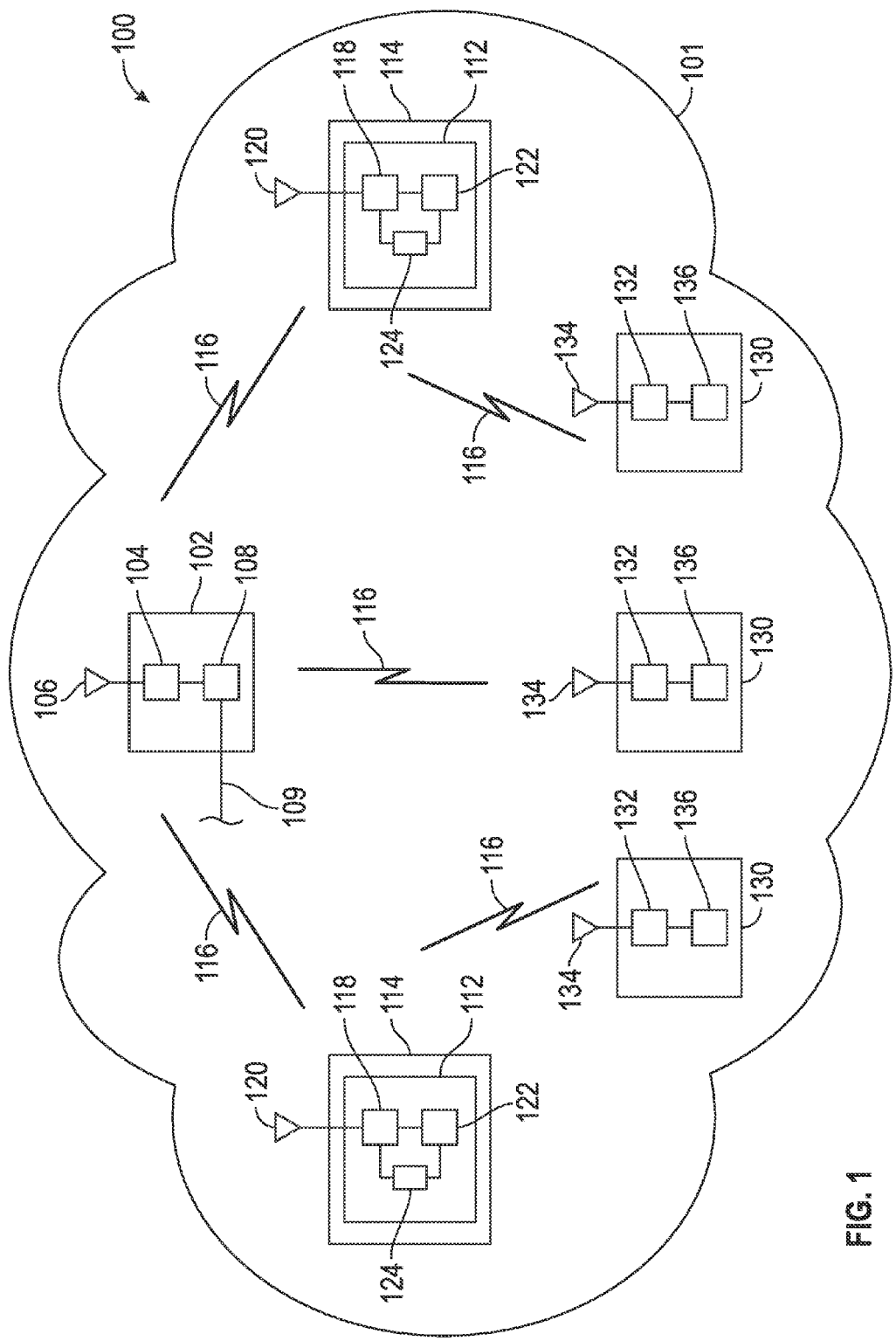
FIG. 1 is a block schematic diagram of a system for facilitating communications in accordance with one exemplary embodiment.

One exemplary embodiment of the system 100 is shown in FIG. 1. The system 100 includes at least one base station 102. The at least one base station 102 of the exemplary embodiments is a wireless telephone station often referred to as a "cell site". Each base station 102 includes a radio 104 and an antenna 106 configured to transmit and receive radio frequency ("RF") signals. The radio 104 may alternatively be referred to as a transceiver, as is appreciated by those skilled in the art. The base station 102 also includes a controller 108 in communication with the radio 104 to control the radio 104 and transfer data there between, as is appreciated by those skilled in the art. The controller 108 may include any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, a field programmable gate array (FPGA), and/or other suitable components that provide the described functionality.

Each base station 102 is in communication with a telecommunications network 109 and configured to transfer data to and from the telecommunications network 109, as is also appreciated by those skilled in the art. The telecommunications network 109 may utilize wireless communications techniques (e.g., RF signals and/or other wireless point-to-point communications) and/or physical links (e.g., electrically conductive wire and/or fiber-optic cables). Although not shown in FIG. 1, the controller 108 may be located remotely from the base station 102 while controlling operation of the base station 102. For instance, control signals may be transmitted from a remotely located controller (not shown) via the telecommunications network 109. The telecommunications network 109 may be connected to, or a part of, the worldwide interconnection of networks known as the Internet.

The system 100 also includes a plurality of vehicular relay nodes 112. The vehicular relay nodes 112 of the exemplary embodiments are each associated with a vehicle 114, such as an automobile. That is, the vehicular relay nodes 112 are supported by or carried by the vehicles 114. However, other suitable vehicles 114 may alternatively be utilized to carry the vehicular relay nodes 112, including, but not limited to, motorcycles, trains, boats, spacecraft, and aircraft. Furthermore, the vehicular relay nodes 112 need not necessarily be associated with vehicles 114. For instance, the vehicular relay nodes 112 may be carried by a person, a bicycle, a cart, etc.

The vehicular relay nodes 112 are configured to communicate via communications links 116 with the at least one base station 102. In the exemplary embodiment shown in FIG. 1, the communications links 116 are implemented wirelessly utilizing RF signals. The wireless links 116 may utilize cellular bands or other bands external to the established cellular bands. Accordingly, the vehicular relay nodes 112 each includes a radio 118 with an antenna 120. The radio 118 may alternatively be referred to as a transceiver, as is appreciated by those skilled in the art. The vehicular relay nodes 112 each also include a controller 122 and a battery 124. The controller 122 may include any hardware, software, firmware, electronic control component, processing logic, and/or processor device, individually or in any combination, including without limitation: ASIC, an electronic circuit, a processor (shared, dedicated, or group) and memory that executes one or more software or firmware programs, a combinational logic circuit, FPGA, and/or other suitable components that provide the described functionality.

It should be appreciated that the communication links 116 between the vehicular relay nodes 112 and the at least one base station 102 may also be implemented with physical links (not shown), e.g., electrically conductive cable and/or fiber optics. For example, with an electric vehicle 114, the physical communication link 116 may be established when the vehicle 114 is plugged into a charging station (not shown).

The battery 124 of each vehicular relay node 112 is electrically connected to the radio 118 and the controller 122 for supplying power to each. The battery 124 may be the same battery used to provide power to other systems (not shown) of the vehicle 114. Alternatively, the battery 124 may be separate from the battery of the vehicle 114.

Each vehicular relay node 112 is configured to relay data between the base station 102 and at least one portable communications device 130, hereafter referred to simply as "the portable device 130" or "the portable devices 130". The portable devices 130 of the exemplary embodiment are handheld devices allowing a user (not shown) to communicate with audio, video, and/or data with the vehicular relay node 112. The portable devices 130 may also be configured to wirelessly communicate directly with the base station 102.

The portable device 130 may be referred to as a cellular phone, a cell phone, a smart phone, a mobile phone, a personal digital assistant, tablet, and/or a walkie-talkie. However, those skilled in the art appreciate other devices that may function as the portable communications device 130. The portable communications device 130 includes a radio 132 and an antenna 134 configured to transmit and receive RF signals via communications links 116. The radio 132 may alternatively be referred to as a transceiver, as is appreciated by those skilled in the art. The portable device 130 also includes a controller 136 in communication with the radio 132. The controller 136 is configured to control the radio 132 and transfer signals and/or data there between. The controller 136 may include any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Those skilled in the art also appreciate that the radio 132, antenna 134, and/or controller 136 may be separate components or integrated with one another as a unitary component. The portable device 130 of this embodiment also includes a battery (not shown). The battery is electrically connected to the radio 132 and the controller 136 for supplying power to each.

In some embodiments, a communications protocol associated with communications between the base station 102 and the vehicular relay node 112 may be different from a communications protocol associated with communications between the vehicular relay node 112 and the portable device 130. Also, in some embodiments, a frequency band associated with communications between the base station 102 and the vehicular relay node 112 may be different from a frequency band associated with communications between the vehicular relay node 112 and the portable device 130.

For example, communications between the base station 102 and the vehicular relay node 112 may be implemented utilizing frequencies and protocols associated with GSM, UMTS, and/or LTE cellular standards, while communications between the vehicular relay node 112 and the portable device 130 may be implemented utilizing cellular protocols and standards as described above or a Wi-Fi connection (i.e., utilizing frequencies and protocols associated with one or more of the IEEE 802.11 family of standards). Of course numerous variations of the frequencies and protocols will be appreciated by those skilled in the art.

Figure 2:
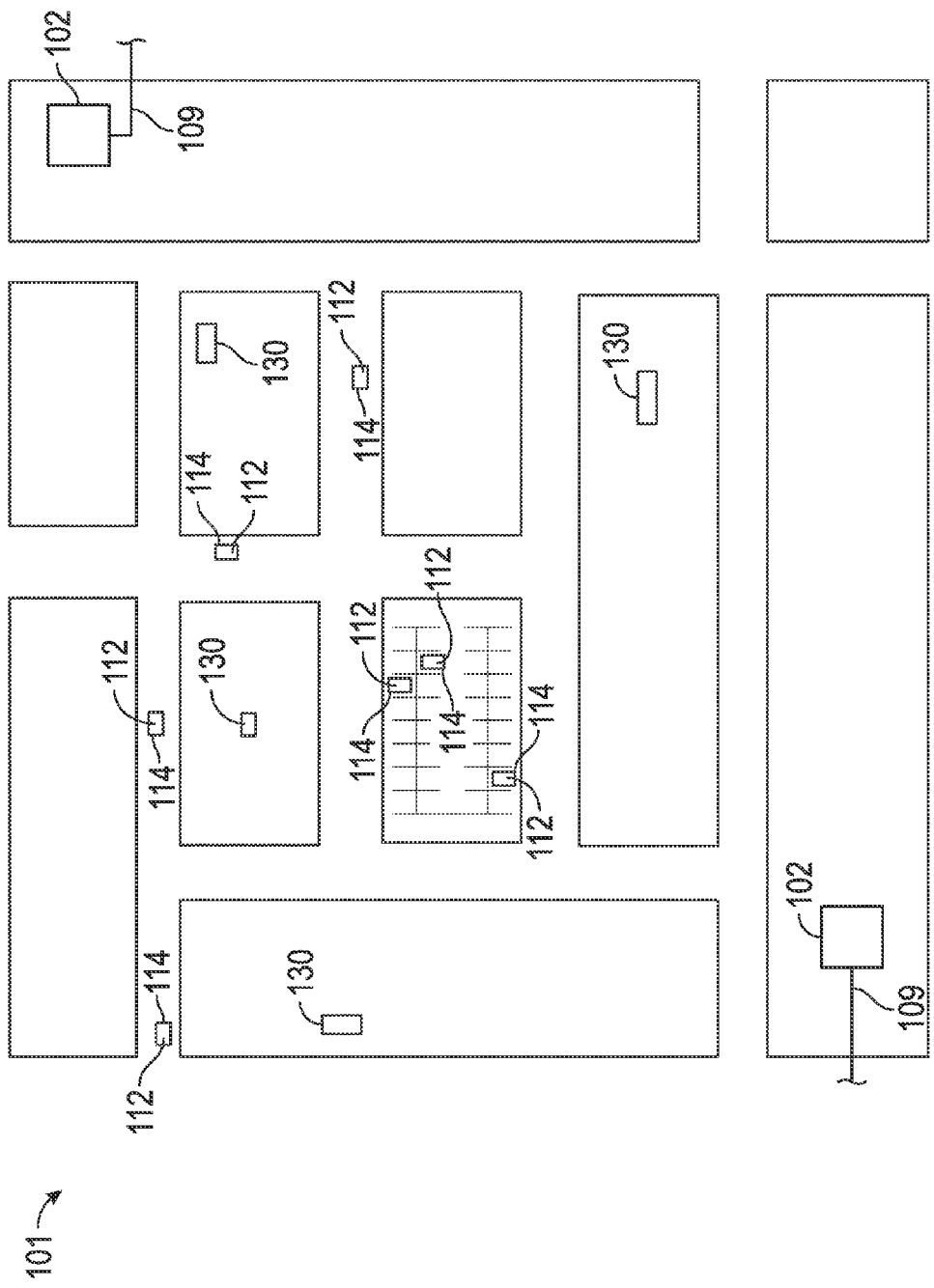
FIG. 2 is a top view of a geographical area showing a plurality of vehicles and associated relay nodes providing communications coverage to the area.

Utilizing the vehicular relay nodes 112 to relay data instead of direct connection between the portable devices 130 and the base stations 102 results in less base stations 102 in the geographic area 101 as well as less overall bandwidth needed at the base stations 102. A view of an exemplary geographic area 101 is shown in FIG. 2, wherein numerous vehicles 114 equipped with vehicular relay nodes 112 are shown in various parking spaces both on the road and in lots. Exemplary embodiments of the methods 300, 400 to determine infrastructure requirements to implement the system 100 in the geographic area 101 are described immediately below.

Figure 3:
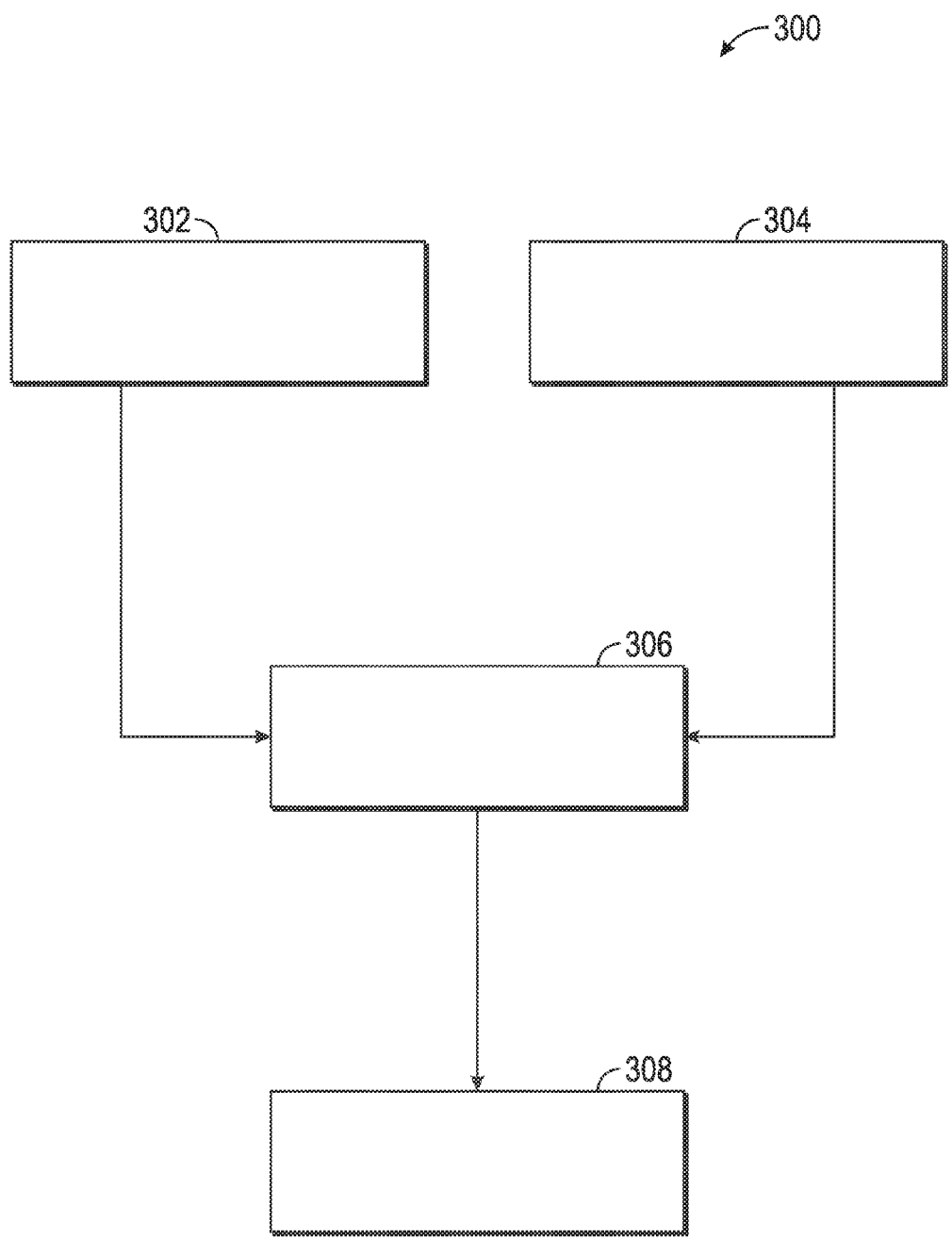
FIG. 3 is a flowchart of a method for planning communication network infrastructure in accordance with one exemplary embodiment.
Figure 4:
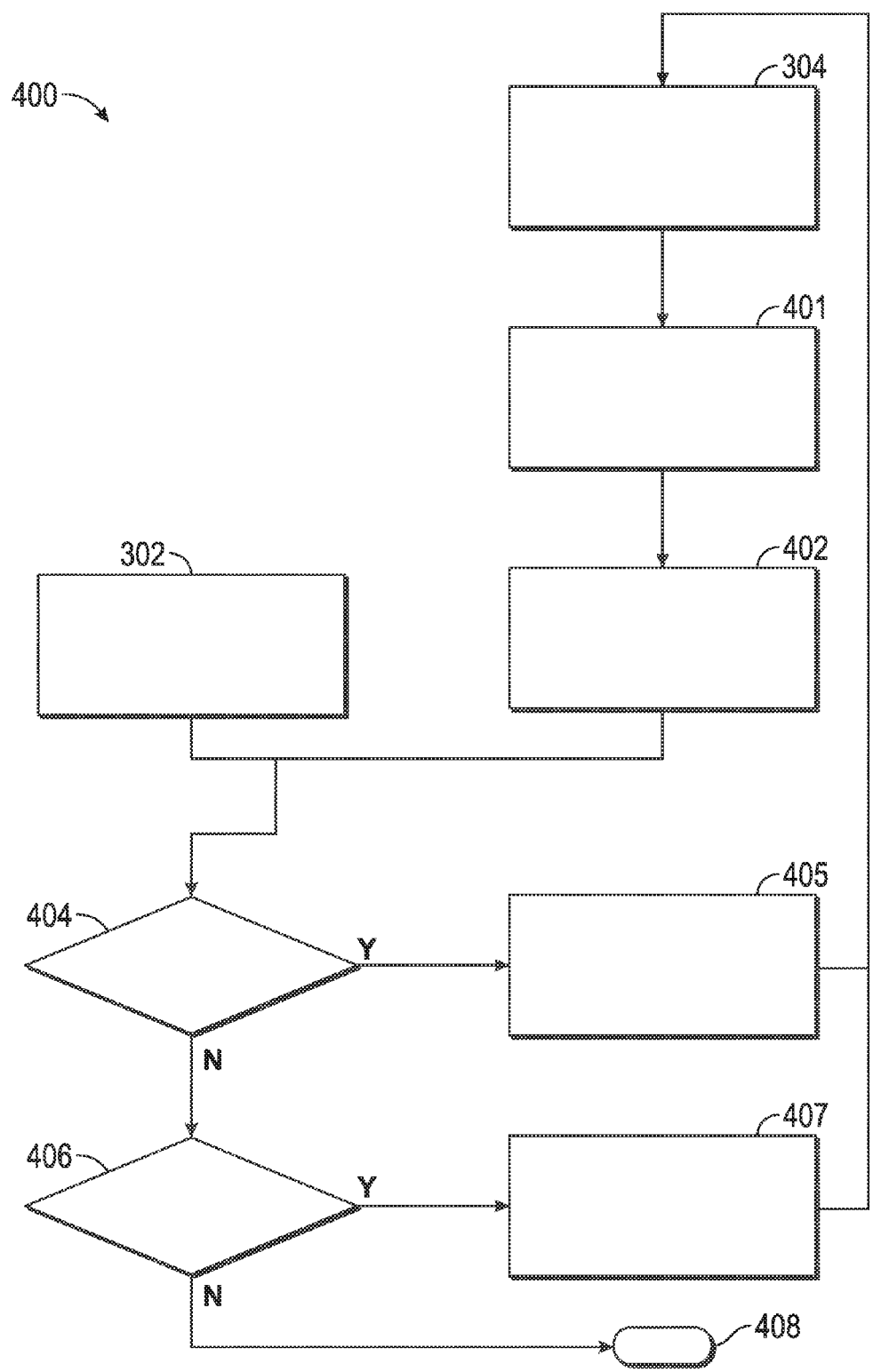
FIG. 4 is a flowchart of a method for planning communication network infrastructure in accordance with one exemplary embodiment.

In the exemplary embodiments shown in FIGS. 3 and 4, and with continuing reference to FIGS. 1 and 2, the methods 300, 400 each include, at 302, calculating a potential capacity $C_p(t)$ of a plurality of vehicular relay nodes 112 in the geographic area 101. In the exemplary embodiments, the potential capacity $C_p(t)$ of the vehicular relay nodes 112 at a certain time period may be calculated as follows:

$$C_p(t) = N_{vehicles}(t) \times P_{VeRN} \times \overline{C}_{VeRN},$$

wherein $N_{vehicles}(t)$ is the number of vehicles 114 in the geographic area 101 during a certain time period; $P_{veRN}$ is a penetration factor corresponding to the proportion of vehicles 114 in the geographic area 101 that are equipped with the vehicular relay node 112; and $\overline{C}_{veRN}$ is the average capacity and is defined in greater detail below.

The number of vehicles 114 in the geographic area 101 during a certain time period $N_{vehicles}(t)$ may be estimated by multiplying the size $A_{BS}$ of the geographic area 101 with the number of parking spaces $N_{space}$ in the geographic area 101 and with the parking utilization $U(t)$ during a certain time period. The parking utilization $U(t)$ refers to the proportion of parking spaces $N_{space}$ that are occupied. The size $A_{BS}$ of the geographic area 101, the number of parking spaces $N_{space}$ in the geographic area 101, and the parking utilization $U(t)$ during a certain time period may be determined by a physical study of the geographic area 101, known standards, and other resources as appreciated by those skilled in the art. Accordingly, the potential capacity $C_p(t)$ of the vehicular relay nodes 112 at a certain time period may be calculated as follows:

$$C_p(t) = A_{BS} \times N_{space} \times U(t) \times P_{VeRN} \times \overline{C}_{VeRN}.$$

The average capacity $\overline{C}_{VeRN}$ may be calculated as follows:

$$\overline{C}_{VeRN} = \frac{1}{N} \sum_{d_i \in D} N_{vehicles}(d_i) \times P_{VeRN} \times C_{VeRN}(d_i),$$

wherein N is the number of vehicles 114 in the area 101, $N_{vehicles}(d_i)$ is the number of vehicles 114 at a certain distance $d_i$ from the at least one base station 102, and $C_{VeRN}(d_i)$ is the capacity at a certain distance $d_i$ from the base station 102. $C_{VeRN}$ can be estimated using a free space or other signal propagation models (e.g, wireless channel simulation models, ray tracing, etc.) to result in simulated/approximated/calculated Signal-to-interference-plus-noise-ratio ("SINR") followed up with employing the Shannon Capacity formula. This approach will result in an upper bound to the actual achievable capacity. In another embodiment, $\overline{C}_{VeRN}$ can be derived from measured SINR followed up by employing the Shannon capacity formula in a direct form or in an implicit form using lookup-tables or other approximation techniques.

The method 300 further includes, at 304, calculating a potential data demand $D(t)$ in the geographic area 101. The potential data demand $D(t)$ refers to the maximum amount of data that is potentially sent or received by the plurality of portable devices 130 in the geographic area 101 in a certain time period. Calculating the potential data demand $D(t)$ may utilize past data usage statistics, future growth predictions, and other data known to those skilled in the art. In another embodiment, the demand $D(t)$ can be inferred from a statistical analysis of the past demands. As an example, one approach that illustrates the above mentioned technique is to estimate the demand distribution for a specific geographical area 101, where the actual demand metric $D(t)$ is inferred out of the distribution function estimate (e.g., mean value+sigma, 90th percentile, etc.).

The method 300 also includes determining whether the number of base stations serving the area is sufficient by utilizing the potential capacity $C_p(t)$ and the potential demand $D(t)$. In the embodiment shown in FIG. 3, this determination is achieved, at 306, by subtracting the potential capacity of the vehicular relay nodes $C_{VeRN}(t)$ from the potential data demand $D(t)$ to obtain a residual demand $d(t)$. The residual demand $d(t)$ may then be used, at 308, to assist in planning of fixed infrastructure, e.g., base stations 102 in the geographic area 101. If the residual demand $d(t)$ is positive, then it may be necessary to add capacity in the geographic area 101, for instance by additional bandwidth at existing base stations 102 or new base stations 102. If the residual demand $d(t)$ is negative then additional capacity may not be warranted.

The method 300 shown in FIG. 3 may be repeated for a plurality of time periods. For example, if the time period is set at one hour, the method may be repeated 24 times to estimate the residual demand $d(t)$ for every hour in a day. A more accurate determination may be found by repeating the method 300 during different days, e.g., 24 times during a normal work day, 24 times during a holiday, and 24 times for a weekend day.

In the method 400 shown in FIG. 4, the determination includes, at 401, calculating a network capacity $C_n(t)$. The network capacity $C_n(t)$ equals the amount of data that the base stations 102 may send and/or receive. $C_n(t)$ can be derived utilizing a long term observation on the base stations 102 associated with geographical area 101. The long term observation process calculates the instantaneous actual capacity and stores it into a register (not shown) each time it exceeds a stored value (i.e. the stored value represents the maximal achieved capacity to that time point). Alternatively, an implicit way to evaluate the maximal achievable capacity, $C_n(t)$, would involve SINR metric mapping for each point in the geographical area 101, across time. The SINR map then can be manipulated using exhaustive search techniques placing vehicular relay nodes 112 across the geographical area 101, to result in $C_n(t)$. The method 400 also includes, at 402, calculating a residual traffic demand $C_r(t)$ by subtracting the network capacity $C_n(t)$ from the potential data demand $D(t)$. The residual traffic demand $C_r(t)$ thus represents the network capacity $C_n(t)$ that is not utilized.

The method 400 then compares, at 404, the potential capacity $C_p(t)$ to the residual traffic demand $C_r(t)$. If the residual traffic demand $C_r(t)$ is greater than the potential capacity $C_p(t)$, then the number of base stations 102 in the geographic area 101 should be increased, as shown at 405. If, at 404, the residual traffic demand $C_r(t)$ is not greater than the potential capacity $C_p(t)$, then, at 406, the method 400 includes subtracting the residual traffic demand $C_r(t)$ from the potential capacity $C_p(t)$ and comparing the result to a predetermined threshold TH. If the result is greater than the predetermined threshold TH, then the number of base stations 102 in the geographic area 101 should be reduced, as shown in 407. Otherwise, the method 400 ends at 408.

Figure 5:
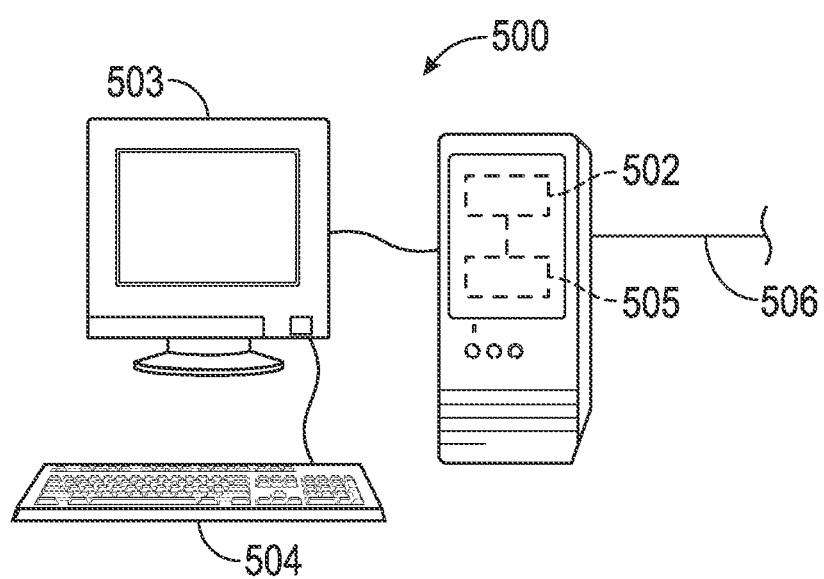
FIG. 5 is a block diagram of an apparatus for planning communication network infrastructure in accordance with one exemplary embodiment.

With reference to FIG. 5, the methods 300, 400 described above may be implemented with an apparatus 500. In FIG. 5, the apparatus 500 is a computer (not separately numbered) having a processor 502 to perform calculations and/or execute instructions, e.g., a program, as is appreciated by those skilled in the art. The computer may include an output device 503, e.g., a display, and an input device 504, e.g., a keyboard and/or a mouse, as is also appreciated by those skilled in the art. The computer may also include a memory 505 for storing data, as is appreciated by those skilled in the art.

The processor 502 may be configured, i.e., programmed, to execute the functions of one or more of the methods 300, 400 described above. As such, the apparatus 500 may be utilized to determine infrastructure requirements for the system 100, in particular, the number of and/or locations of base stations 102 of the system 100.

The computer may be in communications with a network 506, for example, the Internet, such that data and/or other information may be transferred to and from the network 506. For instance, features of the geographic area 101 being studied may be transferred from the network 506 to the computer 500. Additionally, information concerning data usage rates at particular base stations 102 may also be transferred from the network 506 to the computer 500. The output device 503, i.e., the display, may be utilized to show the outputs 308, 405, 407 of the methods 300, 400.

Although the apparatus 500 shown in FIG. 5 illustrates a standard desktop microcomputer, it should be appreciated that numerous configurations of the apparatus may be used to implement the methods 300, 400. For example, the apparatus 500 may be a laptop computer, a tablet, a server, mainframe, or any other configuration that is capable of executing the methods 300, 400 described herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method performed by an apparatus configured to assist in planning communication network infrastructure, comprising:
   calculating a potential capacity of a plurality of vehicular relay nodes in an area, the plurality of vehicular relay nodes relaying data between a plurality of portable devices and at least one base station;
   calculating a potential data demand in the area for transferring data between the plurality of portable devices and the at least one base station; and
   determining if a number of the at least one base station serving the area is sufficient by utilizing the potential capacity of the plurality of vehicular relay nodes in the area and the potential data demand in the area;
   wherein calculating the potential capacity of the plurality of vehicular relay nodes comprises employing a quantity of vehicles in the area and a penetration factor reflecting the proportion of vehicles that are equipped with one of the vehicular relay nodes.

2. The method as set forth in claim 1, wherein calculating the potential capacity of the plurality of vehicular relay nodes comprises employing a size of the area and a quantity of parking spaces in the area.

3. The method as set forth in claim 2, wherein calculating the potential capacity of the plurality of vehicular relay nodes further comprises employing a parking utilization factor that reflects a proportion of the parking spaces that are utilized.

4. The method as set forth in claim 1, further comprising calculating an average capacity of the plurality of vehicular relay nodes in the area.

5. The method as set forth in claim 4, wherein calculating the potential capacity of the plurality of vehicular relay nodes includes employing the average capacity of the plurality of vehicular relay nodes in the area.

6. The method as set forth in claim 5, wherein calculating an average capacity includes employing distances of each of the vehicular relay nodes from the at least one base station.

7. The method as set forth in claim 1, wherein determining if the number of the at least one base station serving the area is sufficient comprises subtracting the potential capacity of the plurality of vehicular relay nodes from the potential data demand to obtain a residual demand.

8. An apparatus configured to assist in planning communication network infrastructure comprising:
   a processor configured to:
   calculate a potential capacity of a plurality of vehicular relay nodes in an area, the plurality of vehicular relay nodes relaying data between a plurality of portable devices and at least one base station;
   calculate a potential data demand in the area for transferring data between the plurality of portable devices and the at least one base station by employing a quantity of vehicles in the area and a penetration factor reflecting the proportion of vehicles that are equipped with one of the vehicular relay nodes; and
   determine if a number of the at least one base station serving the area is sufficient by utilizing the potential capacity of the plurality of vehicular relay nodes in the area and the potential data demand in the area.

9. The apparatus as set forth in claim 8, wherein said processor is configured to calculate the potential capacity of relay nodes by employing a size of the area and a quantity of parking spaces in the area.

10. The apparatus as set forth in claim 9, wherein said processor is configured to calculate the potential capacity of relay nodes employing a parking utilization factor reflecting a proportion of the parking spaces that are utilized.

11. The apparatus as set forth in claim 8, wherein said processor is configured to calculate an average capacity of the plurality of mobile relay nodes in the area.

12. The apparatus as set forth in claim 11, wherein said processor is configured to calculate the potential capacity of relay nodes by employing the average capacity of the plurality of mobile relay nodes in the area.

13. The apparatus as set forth in claim 12, wherein said processor is configured to calculate an average capacity by employing distances of each of the vehicular relay nodes from the at least one base station.

14. The apparatus as set forth in claim 8, wherein said processor is configured to determine if the number of the at least one base station serving the area is sufficient by subtracting the potential capacity from the potential demand to obtain a residual demand.

15. A method performed by an apparatus configured to assist in planning communication network infrastructure, comprising:
   calculating a potential capacity of a plurality of vehicular relay nodes in an area employing an average capacity of the plurality of vehicular relay nodes, wherein the plurality of vehicular relay nodes relay data between a plurality of portable devices and at least one base station;
   calculating a potential data demand in the area for transferring data between the plurality of portable devices and the at least one base station; and
   determining if a number of the at least one base station serving the area is sufficient by utilizing the average capacity of the plurality of vehicular relay nodes in the area and the potential data demand in the area, wherein calculating an average capacity includes employing distances of each of the vehicular relay nodes from the at least one base station.

* * * * *